C. S. RICKER AND R. C. ROOT.
BEARING MEMBER.
APPLICATION FILED JULY 26, 1919.
1,355,266.
Patented Oct. 12, 1920.
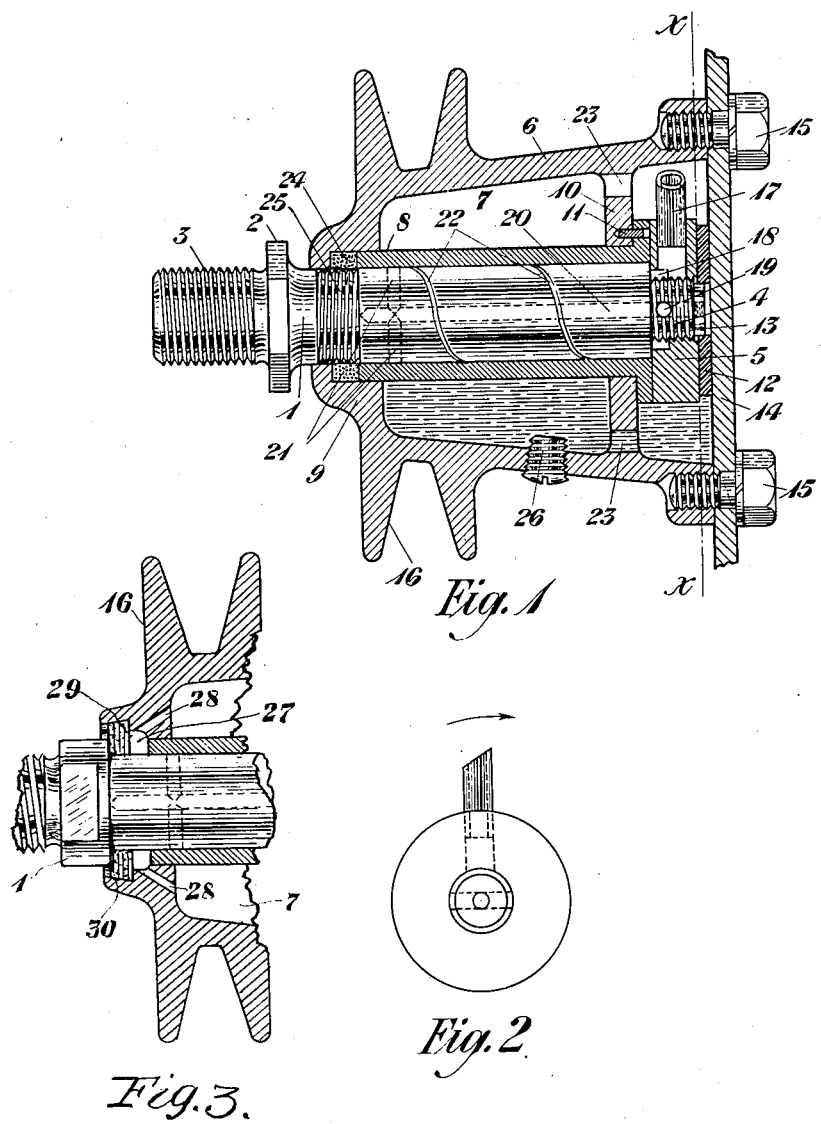
INVENTOR.
Ralph C. Root & Chester S. Ricker
BY William R. Ballard
ATTORNEYS.

UNITED STATES PATENT OFFICE.

CHESTER S. RICKER AND RALPH C. ROOT, OF INDIANAPOLIS, INDIANA.

BEARING MEMBER.

1,355,266.   Specification of Letters Patent.   Patented Oct. 12, 1920.

Application filed July 26, 1919. Serial No. 313,529.

*To all whom it may concern:*

Be it known that we, CHESTER S. RICKER and RALPH C. ROOT, both residing at Indianapolis, in the county of Marion and State of Indiana, have invented certain Improvements in Bearing Members, of which the following is a specification.

This invention relates to hub or bearing members for rotating elements and its object is to provide a simple, strong, compact and inexpensive construction, and to improve the oil distribution in devices of this kind.

The invention will be described in connection with the accompanying drawing in which Figure 1 shows a vertical sectional view of one embodiment thereof, Fig. 2 is a fragmentary view on the line x—x of Fig. 1, and Fig. 3 is a modification.

In the form of bearing illustrated, a stationary spindle 1 is provided at one end with a shoulder 2 and screw threads 3 for clamping it firmly against a suitable support, and, upon the other end, with screw threads 4 to receive a retaining nut 5, the threads 4 preferably being of reduced diameter to provide a shoulder against which the nut may be set. The rotating hub member 6 mounted upon the spindle is arranged to provide a large oil reservoir 7 here shown as formed by coring out the hub and inserting a bearing bushing 8 supported at one end by the end wall 9 and at the other by the inwardly extending web 10 to which it may be keyed by the pin 11. The thrust of the bearing is taken in one direction by the bearing between the retaining nut 5 and the bushing 8, the latter being preferably flanged as shown to increase the bearing surface and to facilitate the keying of the bushing to the web 10. The thrust in the other direction is taken by the opposite side of the retaining nut, whose outer face is preferably provided with a fiber washer 12 fitting over the reduced end 13 of the spindle 1. The plate 14 constituting the outer end wall of the hub bears against the washer 12. This plate is secured in place in any convenient manner as by bolts 15. The washer is for convenience in fitting and for anti-friction purposes and may if desired be omitted without affecting other features of the construction. For driving the hub where it is to be used for carrying a fan or the like, a pulley 16 of any desired form may be provided thereon.

The oiling system comprises a projecting tube 17 seated at its inner end in the retaining nut and opening into a chamber 18 in the nut, which surrounds a transverse opening 19 in the spindle. The transverse opening connects in turn with a channel 20 bored lengthwise of the spindle to a point near the rear end of the bushing 8 where it connects with passages 21 leading to the side bearing surface between the bushing and the spindle. Spiral channels 22 are provided in one or the other of these bearing surfaces, here shown as in the spindle, for the purpose of carrying the oil forward from the outlet 21. The end of the channel 20 forward of the transverse opening 19 is plugged to prevent exit of the oil at that end. The surfaces of the thrust bearings on either side of the nut 5 are lubricated by dipping into the oil in the reservoir or by splash due to the rotation, although the rear one also receives a supply from along the spindle. The upper end of the tube 17 is cut on an angle as shown to present a face to the rotating body of oil. The interior of the hub is preferably given a maximum diameter in the plane of the nut 5 and tube 17 so that oil will flow to this point and be supplied to the tube 17 as long as any remains. Openings 23 are provided in the web 10 to permit the passage of oil from one side to the other.

A packing 24 of cork or other suitable material is preferably seated in the rear wall of the hub at the end of the bushing to prevent escape of oil at this point, and if desired Whitworth or other threads 25 cut in the proper direction, with relation to the rotation of the hub, for feeding back escaped oil, may be provided. The plug 26 is for use in filling the reservoir.

Fig. 3 shows a modification of the means for returning the oil to the reservoir in the hub, in which a chamber 27 is provided in this wall for receiving the escaping oil and this is connected to the main reservoir by diverging channels 28 which act by the centrifugal force of the rotating hub to throw the oil back into the reservoir. A packing 29 of cork or the like seated in a counterbore 30 may be used to close the rear end of the chamber 27 but the action of this arrangement is so positive that the device can even be run with the rear end of the chamber open, so far as the prevention of escape of oil is concerned. With the packing in place as shown the centrifugal force, however, produces a partial vacuum, and the resulting suction on the bearing surfaces assists in the distribution of the oil from the inlet 17. This construction also serves to compensate for any pressure arising within the reservoir due to rise in temperature of the imprisoned air or other causes.

In operation it will be understood that rotation of the hub causes the oil to be carried up and forced into the end of the tube 17 whence it is distributed to the bearings under the pressure thus created. The construction here described affords large bearing surfaces both for the axial and radial pressures and is at once strong, simple and economical to manufacture and assemble and readily accessible for repairs.

It is to be understood that the structure is illustrative only as it is obvious that various modifications in details may be made without departing from the spirit of the invention or the scope of the appended claims.

What is claimed is:

1. In a device of the kind described the combination of a stationary stub shaft provided at one end with means for attaching it to a support, a thrust collar located upon the other end of said shaft, a hub member mounted to rotate upon said shaft and provided externally with driving means and internally with an oil reservoir open at one end, a thrust-bearing surface on said hub for bearing upon the side of said thrust collar more remote from the unsupported end of said shaft, oil channels in said shaft and thrust collar, means located on the thrust collar for intercepting rotating oil in said reservoir and directing it to said channels, and a load supporting member completely closing the open end of said oil reservoir and bearing against the other side of said thrust member and serving, with said hub member, to entirely close the unsupported end of said shaft.

2. In a device of the kind described the combination of a stationary stub shaft provided at one end with means for attaching it to a support, a thrust collar located upon the other end of said shaft, a driving member in the form of a hub provided with an extended cylindrical surface for bearing upon the shaft, and a plain surface for bearing upon one face of said thrust collar, a belt pulley on said driving member having substantially its entire friction surface lying between the ends of said cylindrical bearing surface, and a substantially flat load supporting member secured to one end of said hub member and bearing upon the other surface of said thrust collar, and serving with the hub member to entirely close the unsupported end of said shaft.

3. In a device of the kind described, a stationary stub shaft provided at one end with means for attaching it to a support, a thrust collar removably secured to the other end of said shaft, a driving member in the form of a hub mounted to rotate upon said shaft and provided internally with an extended cylindrical surface for bearing upon said shaft and a plain surface for bearing upon one face of said thrust collar, and formed to provide an oil reservoir, a belt pulley on said driving member having substantially its entire friction surface lying between the ends of said cylindrical bearing surface, oil channels in said shaft and thrust collar, means located on the thrust collar for intercepting rotating oil in said reservoir and directing it through said channels, and a substantially flat load supporting member removably secured to said driving member and completely closing the said oil reservoir and bearing against the other face of said thrust collar, and serving, with said driving member, to entirely inclose the unsupported end of said shaft.

In testimony whereof we have signed our names to this specification this 22nd day of July, 1919.

CHESTER S. RICKER.
RALPH C. ROOT.